United States Patent [19]

Morasca

[11] Patent Number: 5,269,888
[45] Date of Patent: Dec. 14, 1993

[54] METHOD OF FABRICATING INTEGRATED OPTICAL DEVICES BY MEANS OF FIELD-ASSISTED ION EXCHANGE

[75] Inventor: Salvatore Morasca, Como, Italy

[73] Assignee: CSELT - Centro Studi e Laboratori Telecomunicazioni S.p.A., Turin, Italy

[21] Appl. No.: 679,631

[22] Filed: Apr. 2, 1991

[30] Foreign Application Priority Data

Apr. 19, 1990 [IT] Italy .................. 67288 A/90

[51] Int. Cl.$^5$ .............................. C25F 1/00
[52] U.S. Cl. ....................... 204/130; 204/180.1; 204/182.2; 65/3.14; 65/30.13; 65/30.14
[58] Field of Search ............. 65/3.14, 30.14, 30.13; 204/130, 180.1, 182.2

[56] References Cited

U.S. PATENT DOCUMENTS

| | | | |
|---|---|---|---|
| 3,773,488 | 11/1973 | Tran et al. | 204/130 |
| 3,836,348 | 9/1974 | Sumimoto et al. | 65/30.13 |
| 4,400,052 | 8/1983 | Alferness et al. | 65/30.13 |
| 4,668,719 | 5/1987 | Kato et al. | 65/30.13 X |
| 4,842,629 | 6/1989 | Clemens et al. | 65/30.13 |
| 4,867,371 | 9/1989 | Davis et al. | 65/30.13 |
| 5,035,734 | 6/1991 | Honkanen et al. | 65/30.13 |

FOREIGN PATENT DOCUMENTS 60-66210  4/1985  Japan ................... 65/3.14

OTHER PUBLICATIONS

Neuman et al., Ion-exchanged optical waveguides, Mar. 1980, pp. 19-30.
Electronic Letters; vol. 23, No. 22, Oct. 22, 1987, Enage, GB, pp. 1188-1190, B. G. Pantchev: "One-step field-assisted ion exchange for . . . ".
Glastech Ber. 62 (1989), No. 8; pp. 285-297; L. Ross: "Integrated optical components in substrate glasses".
Optics Communications; vol. 60, No. 6, Dec. 15, 1986, pp. 373-375; Bl. Pantchev: 'Multimode strip waveguide formed by ion-exchange . . . '.
Appl. No. 59-92598; Nihon Ita Glass K.K.; JP-A-60-237405; Manufacture of Optical Element by Ion Exchange.

Primary Examiner—John Niebling
Assistant Examiner—Arun S. Phasge
Attorney, Agent, or Firm—Herbert Dubno

[57] ABSTRACT

Integrated optical devices are fabricated by field-assisted ion exchange on a starting substrate, wherein the substrate is first prepared to be connected to a source of potential difference, is duly masked as a function of the optical circuit to be implemented and is dipped in a melted salt, which is an ion source for the exchange, with another electrode for applying the electric field capable of inducing ion exchange.

3 Claims, 1 Drawing Sheet

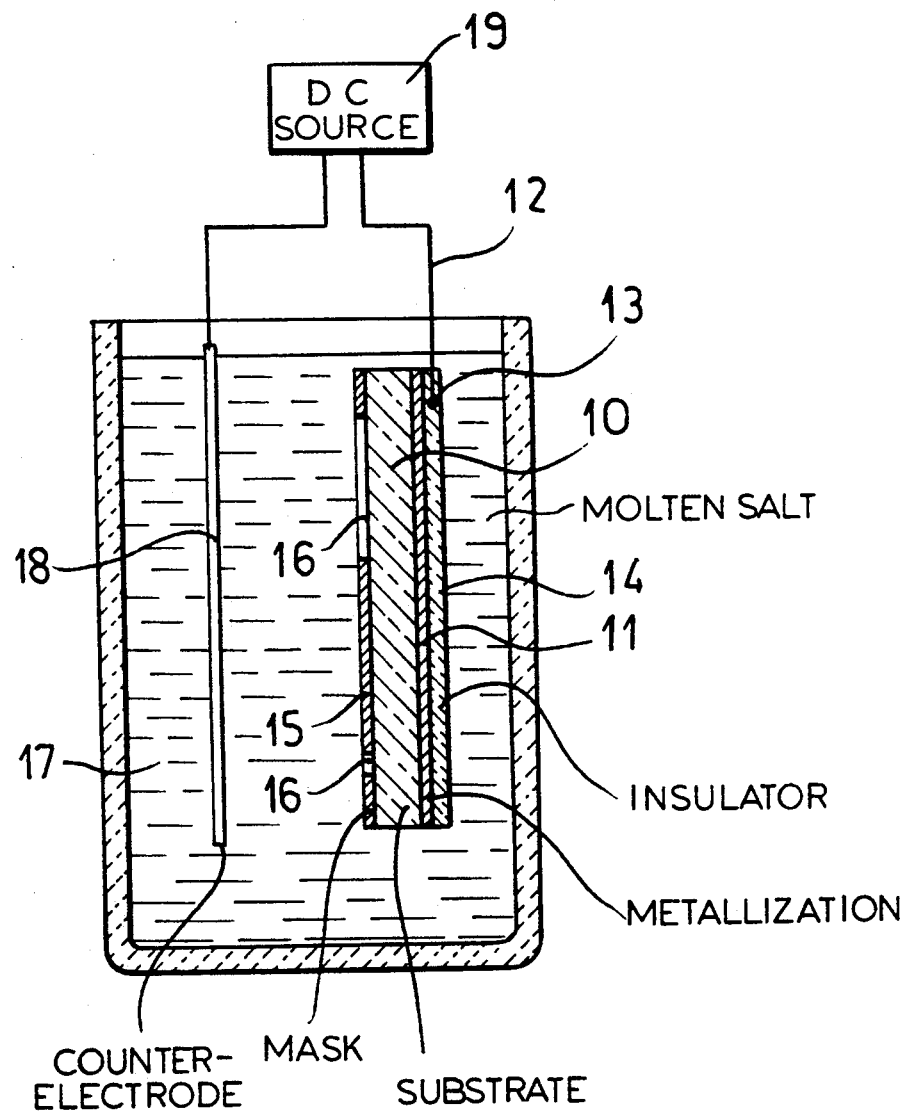

METHOD OF FABRICATING INTEGRATED OPTICAL DEVICES BY MEANS OF FIELD-ASSISTED ION EXCHANGE

FIELD OF THE INVENTION

My present invention relates to a process for the fabrication of devices for processing optical signals and, more particularly, to a method of fabricating integrated optical devices by means of field-assisted ion exchange.

BACKGROUND OF THE INVENTION

Nowadays there is a growing demand for devices and circuits for processing optical signals for different applications, such as signal processing, image transmission, printing, and the like. Such circuits, which not long ago used discrete devices, namely three-dimensional lenses, glasses, mirrors and the like, are now implemented in an optical integrated circuit criteria, wherein light is confined in a plane in which different optical components are integrated, manufactured on a single substrate. The advantages are reduced size and circuits in which all the optical components are perfectly aligned and are not subject to later undesired misalignment, as might happen with discrete components aligned by mechanical supports.

Such devices are manufactured by fabricating the guides and the other optical components, in which the optical field remains confined, on the surface of a substrate made of a convenient material by localized increase of the refractive index.

One of the methods used for this purpose is ion exchange among the ions of the zones which have to take up guiding properties with the ions of different materials which have the characteristic of rendering the refractive index higher than that of the surrounding substrate. In this case the exchange can take place by dipping the substrate in a melted salt of ions to be incorporated in the optical stratum. Some ions of the chosen zones of the substrate interchange with the ions of the melted salt owing to the different concentration. Therefore these zones develop a different composition and hence a different refractive index from that of the substrate.

The concentration profile of the ions inside the substrate obtained from the exchange, and hence the refractive index profile, is chiefly determined by the melted salt temperature and by the exchange duration time. To obtain profiles different from those due to a mere thermal diffusion phenomenon, an external electric field can be applied to induce a guided ion migration along the force-field lines. That allows a better control of exchange phenomena and hence a better definition of the geometric characteristics of the waveguides and of the other optical components manufactured on the substrate.

According to a method described in the article entitled "One-step field-assisted ion exchange for fabrication of buried multimode optical strip waveguide" by B. G. Pantchev, Electronic Letters, Oct. 22, 1987, pages 1188–1190, the substrate floats on a melted salt, which is the ion source and at the same time the electrode for applying the electric field. The same substrate acts also as bottom wall for an upper box also containing a melted salt, used as the other electrode. In correspondence with the zones in which the ion exchange is required, a thin silver layer is deposited, those ions penetrate into the substrate under the action of the electric field. This method is not easily implemented for two reasons: the difficulty of realizing all the conditions necessary to make the substrate float and the difficulty of laying on the substrate itself the upper box filled with the melted salt, obtaining a stable apparatus, especially taking into account that the upper box is to be connected to the electric supply source.

According to another method, a box for melted salt is fabricated by using as walls the various substrates in which the ion exchange is to be effected. The external surfaces of the substrates are metallized, so as to form one electrode for applying the electric field, and the internal surfaces are masked so as to obtain the desired optical geometry. A conductor dipped in the molten salt is the other electrode for applying the electric field. The method requires the building of this box for molten salt whenever an integrated optical device is to be fabricated, taking all the precautions necessary to build a vessel suited to contain a high temperature liquid and to avoid pollution due to extraneous substances (adhesives and the like), used for fabricating the box or introduced by handling. Hence the method is time consuming and expensive.

OBJECT OF THE INVENTION

It is an object of the invention to provide an improved method of fabricating integrated optical devices by means of field-assisted ion exchange which is easy to implement, does not require the fabrication of containers whenever a device is fabricated, and which overcomes the aforementioned disadvantages.

SUMMARY OF THE INVENTION

The present invention provides a method of fabricating integrated optical devices by means of field-assisted ion exchange on a starting substrate, which is characterized in that the substrate surface not involved in the exchange is first metallized, connected to a conductor for the application of the electric field and then insulated by deposition of an insulating-material layer, the surface upon which ion exchange has to take place is covered with a proper masking layer which allows the required optical circuit to be obtained, then the substrate is dipped in a melted salt, which is an ion source for the exchange, with another electrode for applying the electric field apt to induce ion exchange.

BRIEF DESCRIPTION OF THE DRAWING

The above and other objects, features and advantages of the invention will become more readily apparent from the following description, reference being made to the accompanying highly drawing the sole FIGURE of which is a cross sectional view of a field-assisted ion exchange set up for practicing the present invention.

SPECIFIC DESCRIPTION

As indicated in the drawing, an optical substrate 10 can be provided, by metallization, with a metal coating 11 onto which a conductor 12 is affixed at 13 and the insulating layer 14 is then applied. The insulating layer can be composed, for example, of silicon nitride.

The opposite surface of the substrate 10 is provided with a mask 15 and the field-assisted ion exchange can be effected through openings 16 in this mask.

The substrate is immersed in a molten salt bath 17 containing ions which are to be transferred by ion exchange to the substrate 10 and another electrode or a counterelectrode 18, e.g. of platinum, can be introduced into the molten bath so that between the metallization layer 11 and the counterelectrode 18, an electric field, produced by a source 19, is applied across the substrate and the bath to assist in the ion exchange transfer described.

EXAMPLE

The foregoing and other characteristics of the present invention will be made clearer by the following description of a preferred embodiment thereof given by way of a non-limiting example.

The melted salt is poured into a conventional container, which does not react with the melted salt and is not an electric conductor, and an electrode is dipped in the salt for applying the electric field. It is made of a metal which does not react with the melted salt, e.g. platinum. The substrate, on whose surface ion exchange is to be performed for fabricating the integrated optical device, is in turn dipped in the melted salt after convenient preparation. More particularly, the surface which is not involved in the exchange is first metallized, connected to a conductor for applying the electric field and then insulated by deposition of a layer of insulating material, e.g. silicon nitride ($Si_3N_4$). The requirements of this layer are:

lack of porosity;
lack of chemical reactivity with the melted salt;
resistance to the process temperatures;
convenient thickness, in function of the dielectric strength of the material and of potential difference applied across the electrodes.

On the face at which ion exchange is to be performed a convenient masking layer is deposited permitting the desired optical circuit to be obtained. This operation can be performed by using one of the known methods, e.g. a continuous titanium layer can be deposited and then only the zones of the mask at which the exchange is to be performed can be removed.

It is clear that what is described has been given only by way of a non-limiting example and that variations and modifications are possible without going out of the scope of the claims.

I claim:

1. A method of making an integrated optical device by field-assisted ion exchange, comprising the steps of:
   (a) metallizing a surface of an optical substrate opposite a surface at which ion exchange is to be effected to apply a metal coating thereto forming a first electrode;
   (b) connecting a conductor to said metal coating;
   (c) depositing upon said metal coating an insulating layer of silicon nitride resistant to molten salt;
   (d) masking said surface of said optical substrate at which ion exchange is to be effected in a pattern corresponding to patterns in the ion exchange desired in said substrate;
   (e) thereafter immersing said substrate in a bath of a molten salt capable of effecting ion exchange with said substrate and providing in said bath a counterelectrode; and
   (f) applying an electric field across said electrodes, thereby effecting field-assisted ion exchange between said molten salt and said substrate at regions exposed through said mask to form said optical device.

2. The method defined in claim 1 wherein said insulating layer is nonporous and is deposited in a thickness sufficient for a dielectric strength of said insulating layer to resist said electric field.

3. The method defined in claim 2 wherein said counterelectrode is composed of platinum.

* * * * *